(12) United States Patent
Godoy

(10) Patent No.: US 10,509,366 B2
(45) Date of Patent: Dec. 17, 2019

(54) PROTECTIVE SHROUD FOR A DIVE WATCH

(71) Applicant: Cressi-Sub S.P.A., Genoa (IT)

(72) Inventor: Carlos Alberto Godoy, Genoa (IT)

(73) Assignee: Cressi-Sub S.P.A., Genoa (IT)

( * ) Notice: Subject to any disclaimer, the term of this patent is extended or adjusted under 35 U.S.C. 154(b) by 0 days.

(21) Appl. No.: 15/724,626

(22) Filed: Oct. 4, 2017

(65) Prior Publication Data

US 2018/0095428 A1    Apr. 5, 2018

(30) Foreign Application Priority Data

Oct. 4, 2016 (IT) .................. 102016000099468

(51) Int. Cl.

| G04B 43/00 | (2006.01) |
|---|---|
| G02B 25/00 | (2006.01) |
| G04B 47/06 | (2006.01) |
| G04G 21/02 | (2010.01) |

(52) U.S. Cl.
CPC ......... G04B 43/002 (2013.01); G02B 25/002 (2013.01); G04B 47/06 (2013.01); G04G 21/02 (2013.01)

(58) Field of Classification Search
CPC .. G04B 39/00; G04B 37/005; G04B 37/0058; G02B 25/002
See application file for complete search history.

(56) References Cited

U.S. PATENT DOCUMENTS

| 3,704,938 | A | * | 12/1972 | Fanselow | G02B 27/021 |
|---|---|---|---|---|---|
| | | | | | 359/442 |
| 4,060,185 | A | * | 11/1977 | Kuroda | A44C 5/0092 |
| | | | | | 224/176 |
| 4,837,756 | A | * | 6/1989 | Hartman | G04B 37/005 |
| | | | | | 368/286 |
| 5,883,860 | A | * | 3/1999 | McKay | G02B 25/002 |
| | | | | | 359/809 |
| 6,081,392 | A | * | 6/2000 | Pensmith | G02B 25/002 |
| | | | | | 359/440 |
| 6,816,438 | B1 | * | 11/2004 | Zeller | G04B 37/0033 |
| | | | | | 359/809 |
| 2005/0211656 | A1 | * | 9/2005 | Muir | B65D 51/24 |
| | | | | | 215/228 |
| 2006/0171044 | A1 | * | 8/2006 | Carnevali | G02B 25/005 |
| | | | | | 359/802 |
| 2013/0021881 | A1 | * | 1/2013 | Bertucci | G04B 37/1446 |
| | | | | | 368/282 |
| 2016/0320583 | A1 | * | 11/2016 | Hall, Jr. | G02B 7/002 |

FOREIGN PATENT DOCUMENTS

GB            2402229 A  * 12/2004  ........... G02B 25/002

OTHER PUBLICATIONS

"Watch Guard, Protects and Magnifies", May 30, 2011, Leisure Pro, retrieved on Sep. 18, 2019 from https://www.leisurepro.com/p-aquwgmlr/watch-guard-protects-and-magnifies, full document (Year: 2011).*

* cited by examiner

*Primary Examiner* — Daniel P Wicklund

(74) *Attorney, Agent, or Firm* — Blank Rome LLP

(57) ABSTRACT

A protective shroud for a dive watch having a transparent lenticular element configured to enlarge an image appearing on a dial of the dive watch. The shroud can include a rib that distances the lenticular element from the dial, and a flange that extends around the lenticular element and includes two slots for fixing a strap of the dive watch. The shroud can be made of a single piece of elastic material.

13 Claims, 2 Drawing Sheets

PROTECTIVE SHROUD FOR A DIVE WATCH

RELATED APPLICATIONS

This application claims priority to Italy Application No. 102016000099468, filed Oct. 4, 2016. The above-identified related application is incorporated by reference.

FIELD OF USE

The present invention relates to a protective shroud for a dive watch.

BACKGROUND OF THE INVENTION

Dive watches are generally equipped with a protective shroud made of transparent elastic material that protects them from the inevitable impacts that they may undergo during diving activity but that allows the visibility of the dial.

Such protective shrouds generally comprise a protective element for protecting the dial and two projecting slots that allow the passage of a strap in a single piece or the fixing of the two parts thereof.

Dive watches are often actual calculators and, in that case, on their dials, numerous pieces of information appear that are necessary for managing the diver's activities and for his/her safety.

It is therefore necessary for such information to be clearly visible on the watch dial and, in a known way, greater visibility may be obtained with an increase in the size of the dial and therefore of the dimensions of the watch, which implies the inevitable drawbacks associated with such a trivial solution.

SUMMARY OF THE INVENTION

The technical task of the present invention is, therefore, to provide a system which obviates the above-described technical drawbacks of the prior art.

Within the scope of this technical task, an object of the invention is to provide a system that allows a clear view of the dial without an increase in the dimensions of the watch.

The technical task, as well as these and other objects, according to the present invention, are reached by providing a protective shroud for a dive watch characterised in that it comprises a transparent lenticular element configured to enlarge the image that appears on a dial of the watch.

According to another aspect of the invention, the lenticular element is convex.

According to another aspect of the invention, the lenticular element is configured to cover and protect said dial of the watch.

According to another aspect of the invention, a rib is provided for distancing said lenticular element from said dial of the watch.

Advantageously, the thickness of such rib, which distances the lenticular element from the dial, and the lenticular shape itself of the lenticular element, allow the enlargement of the figures that appear on the dial of the watch to be graduated.

Other characteristics of the present invention are further defined in the claims hereinbelow.

BRIEF DESCRIPTION OF THE DRAWINGS

Further characteristics and advantages of the invention will more fully emerge from the description of a preferred but not exclusive embodiment of the protective shroud for a dive watch according to the invention, illustrated by way of non-limiting example in the accompanying figures of the drawings, in which.

DETAILED DESCRIPTION OF THE ILLUSTRATED EMBODIMENTS

Figure 1:
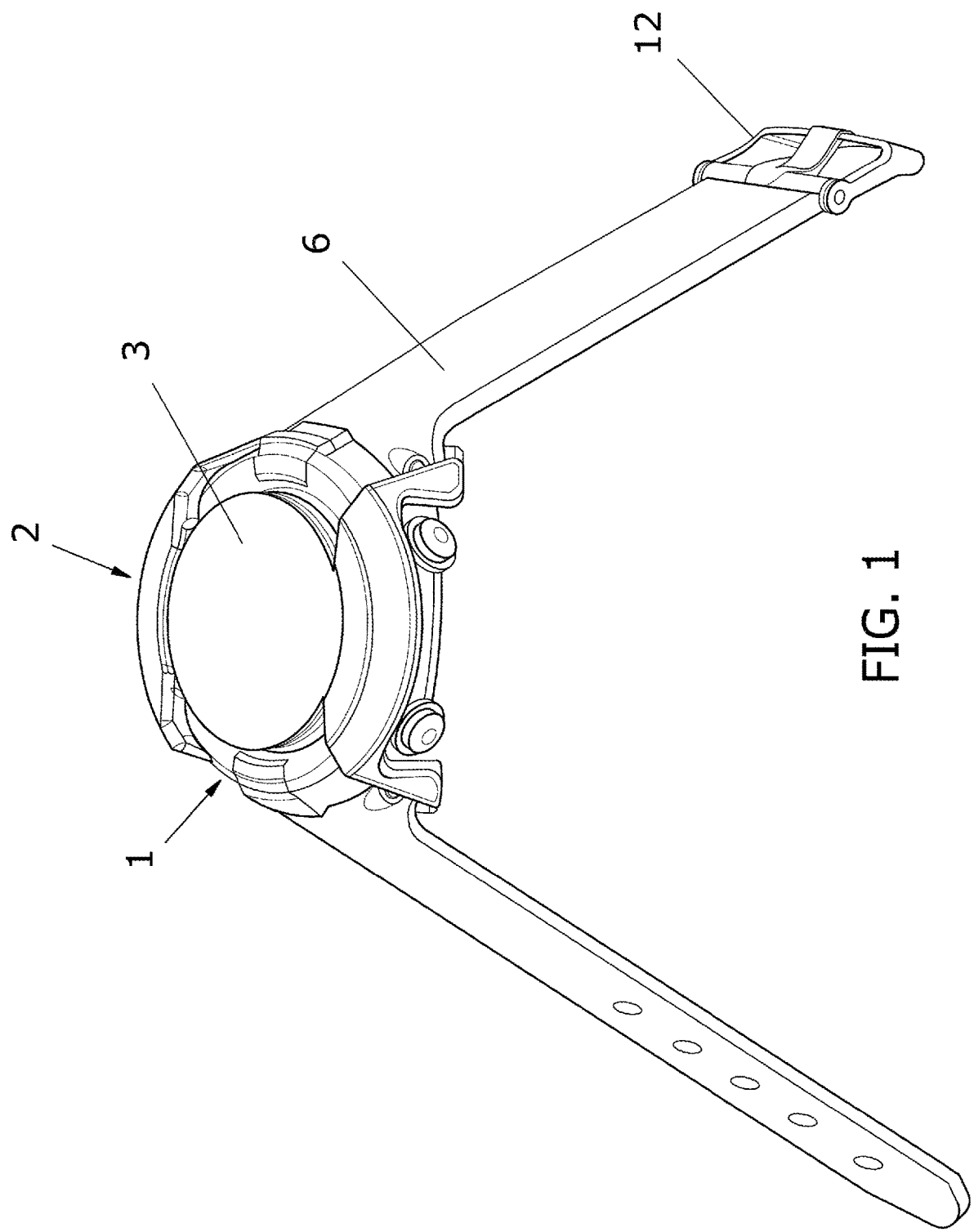
FIG. 1 is a perspective view of a dive watch equipped with a protective shroud according to the invention.
Figure 2:
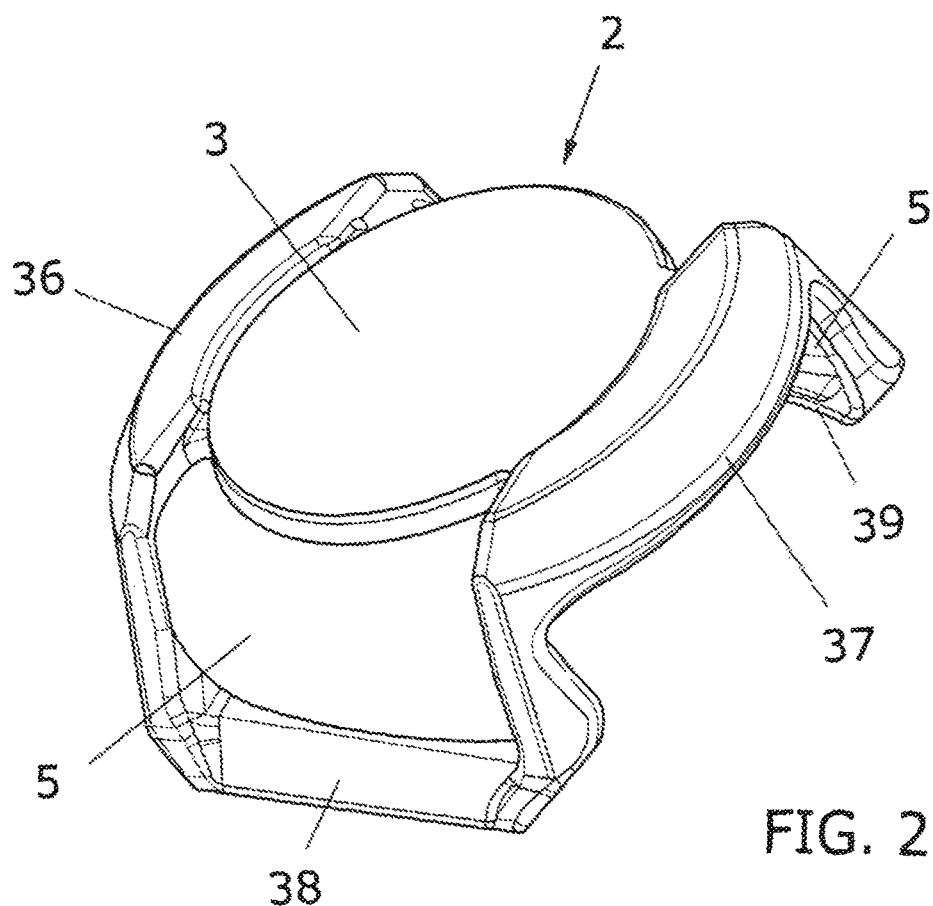
FIG. 2 is the perspective view of the protective shroud only.
Figure 3:
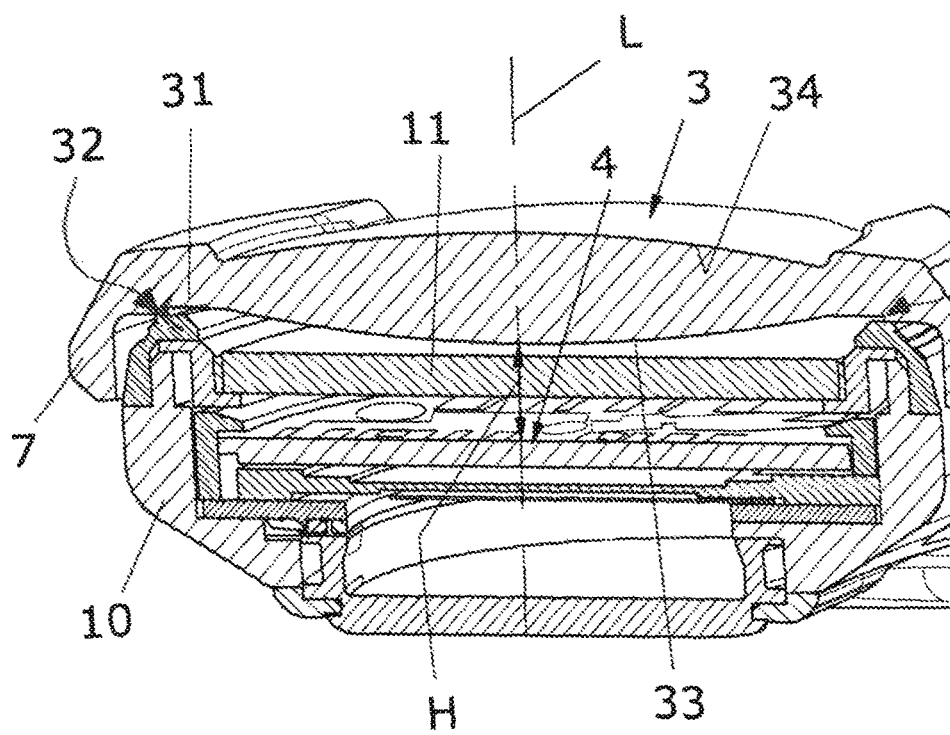
FIG. 3 is a section according to plane of FIG. 1.

With reference to the figures mentioned, a dive watch is shown indicated overall with the reference number 1.

The dive watch 1 comprises in a known way a case 10 that supports a dial 4 surmounted by a protective crystal 11, and a strap 6 equipped with a buckle 12 for fastening the watch 1 to the wrist of the diver.

A protective shroud 2 made of elastic material is fitted onto the watch 1.

The protective shroud 2, being made of elastic material, can be easily fitted and removed from the watch 1 as needed.

The protective shroud 2 advantageously comprises a transparent lenticular element 3 configured to enlarge the image that appears on the dial 4 of the watch 1 and to cover it and protect it.

The lenticular element 3 is convex and is arranged with its optical axis L positioned orthogonally to the dial 4 of the watch 1.

As shown in particular, the lenticular element 3 is biconvex, in the sense that both faces 33, 34 of the lenticular element 3 are convex.

The lenticular element 3 is also flattened, having an extension in the direction of its optical axis L that is substantially smaller than its dimensions in the orthogonal plane to its optical axis L.

The lenticular element 3 has a substantially congruent shape to that of the dial 4, and thus will normally be circular if the dial 4 is circular, rectangular if the dial 4 is rectangular and so on.

The protective shroud 2 further comprises a flange 7 that extends around the lenticular element 3.

The flange 7 comprises two slots 5 for fixing the strap 6 of the watch 1.

The flange 7 has a first pair of angular sectors 36, 37 diametrically opposite the lenticular element 3 configured for covering and protecting the edge of the case 10 of the watch 1.

The flange 7 also has a second pair of angular sectors 38, 39 diametrically opposite the lenticular element 3 having the slots 5.

In the direction of the optical axis L of the lenticular element 3, the first pair of angular sectors 36, 37 has a smaller extension than the second pair of angular sectors 38, 39.

At the face 33 of the lenticular element 3 facing towards the dial 4 of the watch 1, a rib 32 is advantageously provided that supports the lenticular element 3 at an appropriate distance from the dial 4 of the watch 1.

The rib 32 extends along the perimeter 31 of the face 33 of the lenticular element 3 facing towards the dial 4 of the watch 1 and therefore has a substantially congruent shape to that of the perimeter of the dial 4.

The rib 32 will therefore normally be annular if the dial 4 is circular, shaped like a closed broken line if the dial 4 is polygonal, and so on.

In particular, the rib 32 has a uniform thickness so as to be arranged uniformly along the whole perimeter of the dial 4 of the watch 1.

The protective shroud 2 comprising the lenticular element 3, the flange 7 and the rib 32 is preferably made in a single piece, as shown. Alternatively, the protective shroud 2 can be made in various pieces.

If it is in a single piece, in particular, it is made with a single transparent elastic material having a selectively glossy surface finish at the flange 7 and the rib 32 so that only the part that defines the lenticular element 3 is transparent.

Clearly, as mentioned, the shroud can alternatively be provided in various pieces joined together having the same or different elastic and transparency properties.

In conclusion, according to the present invention, better visibility of the dial 4 is obtained with a lenticular element 3 that acts as a magnifying glass.

The distance H between the internal face 33 of the lenticular element 3 and the surface of the dial 4 can be varied so that, together with the choice of convexity of the internal face 33 and the external face 34 of the lenticular element 3, it allows the desired degree of enlargement to be provided.

The protective device for a dive watch as conceived herein is susceptible to many modifications and variations, all falling within the scope of the inventive concept; furthermore, all the details are replaceable by technically equivalent elements.

In practice the materials used, as well as the dimensions, can be any according to the needs and the state of the art.

The invention claimed is:

1. A protective shroud (2) for a dive watch (1), comprising:
    a transparent lenticular element (3) configured to enlarge the image that appears on a dial (4) of the dive watch (1);
    a flange (7) which extends around the lenticular element (3), the flange (7) including:
        two slots (5) for fixing a strap (6) of the dive watch (1) therethrough;
        a first pair of angular sectors (36, 37), diametrically opposed to one another about an outer perimeter of the lenticular element (3), the first pair of angular sectors (36, 37) being located at an elevation of, and adjacent to, the lenticular element (3), the first pair of angular sectors (36, 37) extending along only a portion of, not an entirety of, the outer perimeter of the lenticular element (3), where the outer perimeter of the lenticular element (3) is exposed on two sides thereof, the two exposed sides of the lenticular element (3) being diametrically opposed to one another about the lenticular element (3); each of the first pair of angular sectors (36, 37) configured to protect a respectively adjacent portion of the outer perimeter of the lenticular element (3) and an edge of a case (10) of the dive watch (1); and
    a second pair of angular sectors (38, 39), diametrically opposed to one another at an elevation, relative to a top of the protective shroud (2), below the lenticular element (3) and the first pair of angular sectors (36, 37), wherein:
        a vertical connection stem extends between each end of each of the second pair of angular sectors (38,39) and a respective end of each of the first pair of angular sectors (36, 37); and
        one of the two exposed sides of the lenticular element (3), two of the vertical connection stems, and one of the second pair of angular sectors (38, 39) concur to delimit each of the slots (5).

2. The protective shroud (2) for a dive watch (1) according to claim 1, wherein the lenticular element (3) is convex.

3. The protective shroud (2) for a dive watch (1) according to claim 1, wherein the lenticular element (3) is configured to cover and protect said dial (4) of the watch (1).

4. The protective shroud (2) for a dive watch (1) according to claim 1, wherein the lenticular element (3) is flattened.

5. The protective shroud (2) for a dive watch (1) according to claim 1, wherein, in a direction of an optical axis (L) of said lenticular element (3), said first pair of angular sectors (36, 37) has a smaller extension than said second pair of angular sectors (38, 39).

6. A dive watch (1) comprising the protective shroud (2) according to claim 1.

7. The dive watch (1) according to claim 6, wherein the lenticular element (3) is arranged with an orthogonal optical axis (L) to the dial (4) of the watch (1) and the rib (32) rests perimetrically to the dial (4) on a case (10) of the watch (1).

8. The protective shroud (2) for a dive watch (1) according to claim 1, further comprising a rib (32) configured to distance the lenticular element (3) from the dial (4) of the dive watch (1).

9. The protective shroud (2) for a dive watch (1) according to claim 8, wherein the rib (32) has an outline which is congruent with a perimeter of said dial (4).

10. The protective shroud (2) for a dive watch (1) according to claim 8, wherein the rib (32) extends along a perimeter of a face (33) of said lenticular element (3).

11. The protective shroud (2) for a dive watch (1) according to claim 8, wherein the protective shroud (2) is made of a single piece of elastic material, the single piece of elastic material including the lenticular element (3), the rib (32), and the flange (7).

12. The protective shroud (2) for a dive watch (1) according to claim 11, wherein the single piece protective shroud (2) has a selectively glossy surface finish at the flange (7) and the rib (32), wherein only the lenticular element (3) of the single piece protective shroud (2) is transparent.

13. The protective shroud (2) for a dive watch (1) according to claim 1, wherein an alignment of the diametrically opposed first pair of angular sectors (36, 37) relative to an alignment of the diametrically opposed second pair of angular sectors (38, 39) is 90 degrees.

* * * * *